United States Patent Office 2,773,863
Patented Dec. 11, 1956

2,773,863

MONOAZO-DYESTUFFS

Hans Bolliger, Basel, Switzerland, assignor to Ciba Limited, Basel, Switzerland, a Swiss firm No Drawing. Application January 25, 1954,
Serial No. 406,087

Claims priority, application Switzerland January 28, 1953

7 Claims. (Cl. 260—162)

This invention provides valuable new monoazo-dyestuffs which contain at least one acylated sulfonic acid amide group and at least one group of the formula (1)  —$SO_2$—$(NH)_{n-1}$—R—X in which R represents an aliphatic radical, $n$ represents a whole number not greater than 2, and X represents a labile sulfur-containing substituent.

As labile substituents in the group of the Formula 1 there are to be understood sulfur-containing displaceable substituents which are easily split off in an alkaline medium along with the bonding electron pair, for example, a sulfuric acid ester group or above all a sulfonic acid ester group. Advantageously the labile substituent is present in the γ-position, or preferably the β-position, of the aliphatic radical R which is bound in the α-position through the —NH— group ($n=2$) or directly ($n=1$) to the —$SO_2$— group. The aliphatic radical R may contain further substituents such, for example, as a hydroxyl group. Especially valuable are the dyestuffs of the invention which contain as the group of the Formula 1 a γ-, or above all a β-, sulfonyloxyalkyl-sulfonic acid amide group, for example, a β-(benzene- or toluene-sulfonyloxy)-ethyl sulfonic acid amide group.

In addition to a group of the latter kind the dyestuffs of the invention must contain at least one acylated sulfonic acid amide group, advantagesusly a group of the formula (2)  —$SO_2$—NH-acyl in which the acyl radical may be the radical of a very wide variety of acids, for example aliphatic or aromatic carboxylic acids, but more especially aliphatic or aromatic sulfonic acids. Thus, for example, the acyl radical may be an acetyl, n-butyryl, benzoyl, paratertiary-butylbenzoyl or para-chlorobenzoyl radical but more especially a sulfonyl radical, for example, the methane-sulfonyl, ethane - sufonyl, n - butane - sulfonyl, benzene - sulfonyl, naphthalene-β-sulfonyl, para-methyl - benzene - sulfonyl, ortho- or para-chlorobenzene-sulfonyl or 2:5-dichlorobenzene sulfonyl radical.

The acylated sulfonic acid amide group and the group of the Formula 1 may be present in any desired positions in the dyestuff molecule, that is to say, one group of these two kinds may be present in the radical of a single component or one dyestuff component may contain, for example, the acylated sulfonic acid amide group and the other component the group of the Formula 1. Especially valuable are monoazo-dyestuffs of this kind which contain the group of the Formula 1 in the radical of the diazo component and the acylated sulfonic acid amide group in the radical of the azo component.

The dyestuffs of the invention are advantageously prepared from dyestuff components which already contain the aforesaid groups. The dyestuff components used may of course contain further substituents, such, for example, as halogen atoms, nitro groups, acylamino, alkyl or alkoxy groups. However, it is of advantage to use diazo compounds which contain no hydroxyl group in ortho-position to the diazo group.

The dyestuff components which contain an acylated sulfonic acid amide group can be made by methods in themselves known by acylating the corresponding unsubstituted sulfonic acid amide with any desired acid halide, for example, with an aliphatic or aromatic carboxylic acid chloride or advantageously with an aliphatic or aromatic sulfonic acid chloride. If necessary, any hydroxyl or amino group present in the product to be acylated may be protected or need not be present as such but in the form of a substituent convertible into such a group after the acylation. It is also possible in certain cases to use the corresponding sulfonic acids, instead of the corresponding non-acylated sulfonic acid amides, in which case, after protecting any sensitive groups, for example, by acylation, the sulfonic acid group is converted in known manner into a sulfonic acid chloride group, the resulting sulfochloride is reacted with an aliphatic or aromatic amide to form the acylated sulfonic acid amide, and the protected groups are then re-formed.

As examples of suitable starting materials there may be mentioned:

A. Components containing an acylated sulfonic acid amide group, such as: Diazo compounds of 1-aminobenzene-3- or -4-sulfonic acid N-acetylamide, 4-methyl- or 4-methoxy-1-aminobenzene-3-sulfonic acid N-benzoylamide, 1-aminobenzene-2-sulfonic acid N-(methane sulfonyl)-amide, 1-aminobenzene-2- or -3- or -4-sulfonic acid N-(para-toluene-sulfonyl)-amide, 2-chloro-1-aminobenzene-5-sulfonic acid N-benzene sulfonyl amide, 4-methyl-1-aminobenzene-2-sulfonic acid N-benzene sulfonylamide, 1-amino-2-methylbenzene-5-sulfonic acid N-benzene sulfonylamide or 1-amino-2:6-dichlorobenzene-4-sulfonic acid N-benzene sulfonylamide, and coupling components such as 1-hydroxynaphthalene-4- or -5-sulfonic acid N-acetylamide, 1-hydroxynaphthalene-4- or 5-sulfonic acid N-benzenesulfonylamide, 2-hydroxynaphthalene-3-, -4-, -5-, -6-, -7- or -8-sulfonic acid-N-benzoylamide, 8-hydroxyquinoline-5-sulfonic acid N-(para-toluene sulfonyl)-amide, 2-aminonaphthalene-6-sulfonic acid-N-benzene sulfonylamide, 2-amino -8-hydronaphthalene-6-sulfonic acid N-(paratoluene sulfonyl)-amide, 2-amino-8-hydroxynaphthalene-6-sulfonic acid N-benzene sulfonyl-amide, 2-amino-8-hydroxynaphthalene-6-sulfonic acid-N-(2′:5′-dichlorobenzoyl)-amide, 1 - (α - naphthyl)-3-methyl-5-pyrazolone-4′-sulfonic acid-N-acetylamide, 1-phenyl-3-methyl-5-pyrazolone-2′-, -3′- or -4′-sulfonic acid N-(paratoluene sulfonyl)-amide, 1-phenyl-3-methyl-5-pyrazolone-2′-, -3′- or -4′-sulfonic acid N-(parachlorobenzene sulfonyl)-amide, 1-phenyl-3-methyl-5-pyrazolone-2′-, -3′- or -4′- sulfonic acid -N- benzene sulfonylamide, 1-phenyl-3-methyl-5-pyrazolone-2′-, -3′- or -4′-sulfonic acid N-(2″:5″-dichlorobenzene sulfonyl)-amide, 1-phenyl-3-methyl-5-pyrazolone-2′-chloro-5′-sulfonic acid N-benzene sulfonyl-amide, 1-phenyl-3-methyl-5-pyrazolone-2′:6′-dichloro-4'-sulfonic acid - N-benzene sulfonyl - amide, 1 - acetoacetylaminobenzene-2-, -3- or -4-sulfonic acid-N-benzoylamide, 1-acetoacetylamino-benzene-2-, -3- or -4- sulfonic acid-N-benzene sulfonylamide.

The aforesaid pyrazolone coupling components may be prepared from arylamines containing an acylated sulfonic acid amide group by diazotizing such an amine, reducing the resulting diazo-compounds to a hydrazine, for example, by means of an alkali bisulfite or stannous chloride, and condensing the hydrazine so obtained with an acylacetic acid amide or with an acylacetic acid ester, especially acetoacetic acid methyl or ethyl ester, the formation of the pyrazolone being completed without hydrolysis of the acylated sulfonic acid amide group.

B. Components which contain a group of the above Formula 1, such as the diazo compounds of the following amines: 1-aminobenzene-4-sulfonic acid-β-(ethane sulfonyloxy)-ethylamide, 1-aminobenzene-3- or -4-sulfonic acid-β-(benzenesulfonyloxy)-ethylamide, 1-aminobenzene-4-sulfonic acid-γ-(benzene sulfonyloxy)-propylamide, 1-aminobenzene-4-sulfonic acid - γ - (para-toluenesulfonyloxy)-propylamide, 4-methyl-1-aminobenzene - 3 - sulfonic acid-β-(para-toluenesulfonyloxy)-ethylamide, 2:5-dichloro-1 - aminobenzene-4-sulfonic acid-β-(benzenesulfonyloxy)-ethylamide, 2-methoxy-1-aminobenzene-5-β-(para-toluenesulfonyloxy)-ethylsulfone, 1-aminobenzene-2-, -3- or -4-sulfonic acid-β-(para-toluenesulfonyloxy)-ethylsulfone, 4-methyl-1-aminobenzene-3-sulfonic acid - β - (benzenesulfonyloxy)-ethylamide, and the following coupling components: 2-aminonaphthalene-6-sulfonic acid-β-(benzenesulfonyloxy)-ethylamide, 1-hydroxynaphthalene-4- or -5-sulfonic acid - β - (benzenesulfonyloxy)-ethylamide, 2-hydroxynaphthalene-6-sulfonic acid-β-(benzenesulfonyloxy)-ethylamide, 2-hydroxynaphthalene-6-β-(benzenesulfonyloxy)-ethylsulfone, 1-phenyl-3-methyl - 5 - pyrazolone-2'-, -3'- or -4'-sulfonic acid-β-(benzenesulfonyloxy)-ethylamide, 1-phenyl-3-methyl-5-pyrazolone-3'-sulfonic acid-γ-(benzenesulfonyloxy)-propylamide, 1-phenyl-3-methyl-5 - pyrazolone-3'-β-(para-toluenesulfonyloxy)-ethylsulfone, 1 - phenyl-3-methyl-5-pyrazolone-3'-sulfonic acid-β-(para-toluenesulfonyloxy)-ethylamide, 1 - phenyl - 3 - methyl-5-pyrazolone-4'-β-(para-toluenesulfonyloxy)-ethylsulfone.

The monoazo-dyestuffs obtainable from the aforesaid components are new and can be made by coupling a diazo compound mentioned under A with a coupling component mentioned under B or advantageously by coupling a diazo compound mentioned under B with a coupling component mentioned under A in a not strongly alkaline, and advantageously a neutral to acid, medium.

The resulting azo dyestuffs contain at least one acylated sulfonic acid amide group and at least one group of the formula (1)       —SO₂—(NH)ₙ₋₁—R—X in which R represents an aliphatic radical, n represents a whole number not greater than 2 and X represents a labile sulfur-containing substituent. The dyestuffs of this constitution which contain a group of the Formula 1 in which n is the whole number 2, can be made by a method other than by coupling, namely, by introducing the two groups, that is to say, the group of the Formula 1 in which n is the whole number 2, and the acylated sulfonic acid amide group into a finished dyestuff free from these groups by methods in themselves known which can be used mutatis mutandis for introducing these groups into the dyestuff components mentioned above. For this purpose, for example, in accordance with the process of Patent No. 2,759,921 (application Ser. No. 343,501, filed March 19, 1953, in U. S. A. by Max Schmid and Rudolf Mory), a dyestuff which contains two sulfonic acid groups may be converted into the corresponding disulfochloride, and the latter is then asymmetrically amidated, that is to say, amidated in such manner that one of the sulfochloride groups is converted, for example, by reaction with an acylamide into an acylated sulfonic acid amide group, and the other sulfochloride group is converted, for example, by reaction with a primary alkylamine containing a β- or γ-sulfonyloxy group into a group of the Formula 1.

Those dyestuffs of the invention which contain a sulfonylated sulfonic acid amide group can be made very advantageously by reacting 1 mol of a dyestuff, which contains a —SO₂NH₂ group and an hydroxyalkyl sulfone group or a sulfonic acid N-hydroxyalkylamide group, with at least 2 mols of an organic sulfonic acid halide, for example, tosyl chloride, benzene sulfonylchloride or ethanesulfonyl chloride, in such manner that the —SO₂NH₂ group, on the one hand, and the hydroxyl group of the sulfonic acid N-hydroxyalkylamide group or of the hydroxyalkylsulfone group, on the other, are acylated.

Especially valuable among the new dyestuffs of the invention are monoazo-dyestuffs of the formula (3)

in which R represents the radical of a diazo component of the naphthalene or advantageously the benzene series, B represents an aliphatic radical which contains in the β- or γ-position a sulfonyloxy group, n represents a whole number not greater than 2, and Pz represents a 5-pyrazolone radical which is bound to the azo linkage in 4-position and contains in the 3-position or advantageously in the 1-position an aryl radical substituted by an acylated sulfonic acid amide group. Advantageously such monoazo-dyestuffs are devoid of free sulfonic acid and carboxylic acid groups.

The dyestuffs of the invention can be used for dyeing or printing various materials, especially nitrogenous natural or artificial fibers such as leather, silk or wool, and also structures of superpolyamides or superpolyurethanes. They are suitable for dyeing from weakly acid to neutral baths. Dyeings so produced are level and are distinguished by their good fastness to light and remarkable fastness to washing, fulling and alkalies.

As compared with the comparable dyestuffs hitherto known, which contain an acylated sulfonic acid amide group, the dyestuffs of this invention have the advantage of yielding dyeings of much better fastness to washing, and as compared with the comparable known dyestuffs which contain a β-halogen-alkyl amide group the dyestuffs of this invention are distinguished by their enhanced affinity when applied from neutral baths, and also by their improved fastness to washing.

The following examples illustrate the invention, the parts and percentages being by weight unless otherwise stated, and the relationship of parts by weight to parts by volume being the same as that of the kilogram to the liter:

*Example 1*

38.5 parts of 1-methyl-4-aminobenzene-2-sulfonic acid β-(para-toluene sulfonyloxy)-ethylamide of the formula

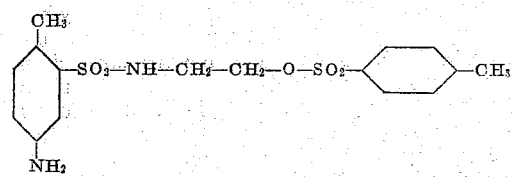

(prepared from 1 - methyl - 4 - acetylaminobenzene - 2-sulfonic acid - β - hydroxyethylamide by reaction with para-toluenesulfonic acid-chloride and saponification of the acetyl radical from the acetylamino group) are diazotized in 100 parts of water and 25 parts of hydrochloric acid (density=1.18) with 6.9 parts of sodium nitrite, and coupled with a solution of 40 parts of 1-phenyl-3-methyl-5-pyrazolone-3'-sulfonic acid N-benzenesulfonylamide and 30 parts of crystalline sodium acetate in 300 parts of water. When the coupling is finished the dyestuff formed, which in the form of the free acid corresponds to the formula

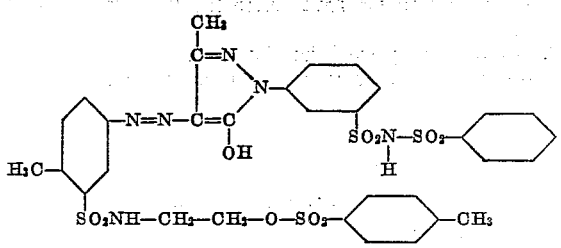

is salted out, filtered off and dried. There is obtained an orange-red powder which dissolves in water with a yellow coloration. It dyes wool from neutral to weakly acid baths pure yellow tints of excellent fastness to washing, fulling and light.

Example 2

40 parts of 1 - methoxy - 2 - aminobenzene - 4 - sulfonic acid $\beta$ - (paratoluenesulfonyloxy) - ethylamide of the formula

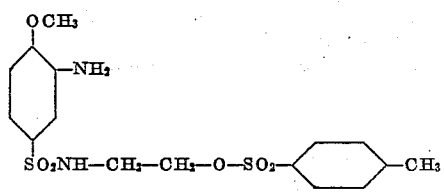

(obtained by reaction of 1-methoxy-2-acetylaminobenzene - 4 - sulfonic acid - $\beta$ - hydroxyethylamide with para-toluenesulfonic acid-chloride in the presence of pyridine and subsequent saponification of the acetyl radical from the acetylamino group in acid medium) are diazotized as described in Example 1, and coupled with a solution of 48 parts of 1-phenyl-3-methyl-5-pyrazolone-3'-sulfonic acid N-(2':5'-dichlorobenzenesulfonyl)-amide and 30 parts of crystalline sodium acetate in 300 parts of water. After precipitation and filtration, there is obtained the dyestuff which corresponds to the formula

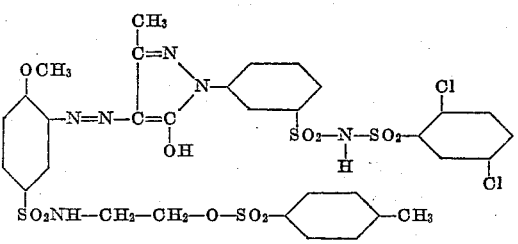

in the form of the free acid. When dry it is a yellow-red powder which dissolves in water with a yellow coloration and dyes wool from a neutral to weakly acid bath a pure yellow tint of excellent fastness to washing, fulling and light.

In the following table are given similar dyestuffs which were obtained by the method described above from the diazo- and coupling-components mentioned in columns I and II, and which dye wool from a neutral to weakly acid bath the tints given in column III:

| | I<br>Diazo components | II<br>Coupling components | III |
|---|---|---|---|
| 1 | H₂N—⟨⟩—SO₂—CH₂—CH₂—O—SO₂—⟨⟩ | CH₃–C=N / N–⟨⟩–SO₂NH–SO₂–⟨⟩ / CH=C–OH | yellow. |
| 2 | CH₃–⟨⟩(–SO₂NH–CH₂–CH₂–O–SO₂–⟨⟩–CH₃)(–NH₂) | CH₃–C=N / N–⟨⟩(Cl)–SO₂NH–SO₂–⟨⟩ / CH=C–OH | Do. |
| 3 | CH₃–⟨⟩(–SO₂NH–CH₂–CH₂–O–SO₂–⟨⟩–CH₃)(–NH₂) | CH₃–C=N / N–⟨⟩(Cl)(Cl)–SO₂NH–SO₂–⟨⟩ / CH=C–OH | Do. |
| 4 | OCH₃–⟨⟩(–NH₂)(–SO₂NH–CH₂–CH₂–O–SO₂–⟨⟩–CH₃) | CH₃–C=N / N–⟨⟩–SO₂NH–SO₂–⟨⟩(Cl)(Cl) / CH=C–OH | Do. |
| 5 | OCH₃–⟨⟩(–NH₂)(–SO₂NH–CH₂–CH₂–O–SO₂–⟨⟩–CH₃) | CH₃–C=N / N–⟨⟩–SO₂–NH–SO₂–CH₂CH₃ / CH=C–OH | Do. |

The pyrazolones used as coupling components can be prepared as follows:

31.2 parts of 3-aminobenzene-1-sulfonic acid N-benzenesulfonylamide are dissolved in 125 parts by volume of water with the addition of 5.3 parts of anhydrous sodium carbonate. After the addition of 6.9 parts of sodium nitrite, the mixture is introduced, while stirring vigorously, into a mixture of 100 parts of ice and 10 parts by volume of sulfuric acid (density=1.8). After 20 minutes the precipitated diazonium compound is rapidly filtered off, and introduced into an ice-cold mixture of 45 parts by volume of aqueous sodium bisulfite containing 550 grams NaHSO₃ per liter, 22 parts by volume of sodium hydroxide solution of 30 percent strength and 30 parts by volume of water. The whole is stirred for one hour at 0–5° C. and then for 2 hours at 20° C., heated to the boil, and 70 parts by volume of hydrochloric acid (density=1.18) are introduced dropwise in the course of ½ hour. After being maintained for a further 20 minutes at 95° C. the mixture is cooled to 20° C. and filtered. The crystalline precipitate, which is the hydrazine derivative, is dissolved in 150 parts by volume of water with the addition of 5.3 parts of anhydrous sodium carbonate. After introducing dropwise 13 parts by volume of acetoacetic acid ethyl ester, the whole is heated at the boil for one hour. At the end of this period 18 parts by volume of hydrochloric acid (density=1.18) are introduced dropwise, and the mixture is allowed to cool while stirring. By filtering off and drying the precipitate, there is obtained the desired 1 - phenyl - 3 - methyl - 5 - pyrazolone - 3' - sulfonic acid-N-benzenesulfonylamide, which may be purified by recrystallization from a large quantity of water.

By using 31.2 parts of 4-aminobenzene sulfonic acid N-benzene sulfonylamide and otherwise proceeding in the same manner there is obtained 1-phenyl-3-methyl-5-pyrazolene-4'-sulfonic acid N-benzenesulfonylamide.

From 34.7 parts of 3-amino-4-chlorobenzene-1-sulfonic acid N-benzenesulfonylamide there is obtained by the same method 1-phenyl-3-methyl-5-pyrazolone-2'-chloro-5'-sulfonic acid N-benzenesulfonylamide, and from 38.1 parts of 4-amino-3:6-dichlorobenzene-1-sulfonic acid N-benzenesulfonylamide there is obtained 1-phenyl-3-methyl-5-pyrazolone-2':5'-dichloro-4'-sulfonic acid N-benzenesulfonylamide.

*Example 3*

0.5 part of the dyestuff obtainable as described in Example 1 is dissolved in 4000 parts of water, 10 parts of crystalline sodium sulfate are added, and 100 parts of well wetted wool are entered into the dyebath so obtained at 40–50° C. 3 parts of acetic acid of 40 percent. strength are then added, the bath is raised to the boil in the course of ½ hour and dyeing is carried on at the boil for ¾ hour. Finally the wool is rinsed with cold water and dried. There is obtained a level yellow dyeing of good fastness to light and excellent fastness to washing.

A level yellow dyeing of good fastness to light and excellent fastness to washing is likewise obtained by proceeding as described in this example, but without the addition of acetic acid to the dyebath.

What is claimed is:

1. A monoazo dyestuff free from sulfonic and carboxylic acid groups which corresponds to the formula

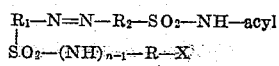

wherein $R_1$ represents a benzene radical, $R_2$ represents the radical of a 5-pyrazolone bound to the azo linkage in 4-position, $n$ represents a whole number up to and including two, R represents an alkyl radical of two carbon atoms which bears the substituent X in β-position, and X represents a hydroxyl group esterified by a benzene sulfonic acid.

2. A monoazo dyestuff free from sulfonic and carboxylic acid groups and corresponding to the formula

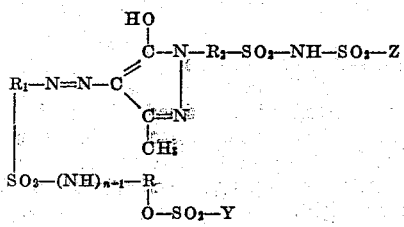

wherein $R_1$, $R_2$, Y and Z each represents a benzene radical, R represents an alkyl radical of two carbon atoms bearing the substituent $O-SO_2-Y$ in β-position, and $n$ represents a whole number up to and including two.

3. The monoazo dyestuff of the formula

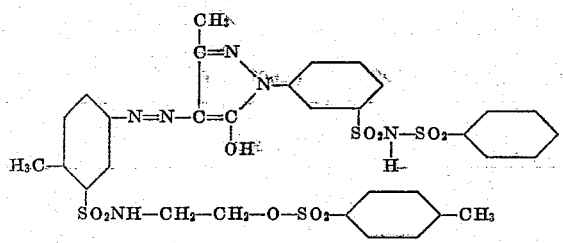

4. The monoazo dyestuff of the formula

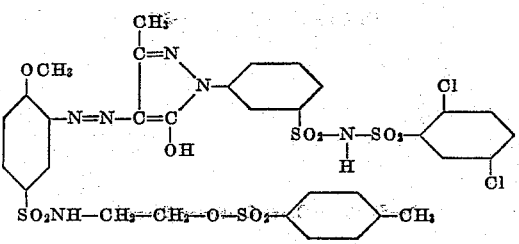

5. The monoazo dyestuff of the formula

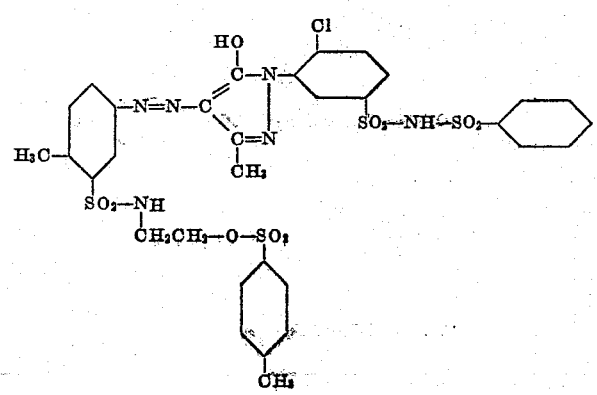

6. The monoazo dyestuff of the formula
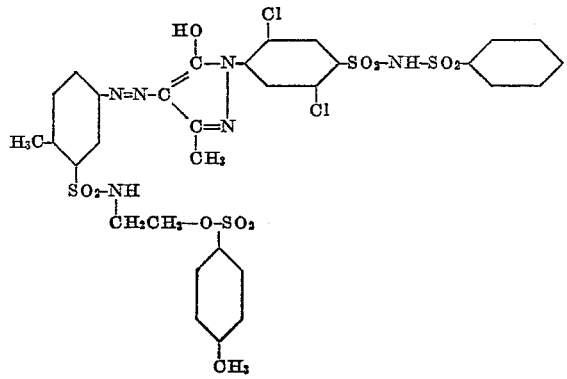
7. The monoazo dyestuff of the formula
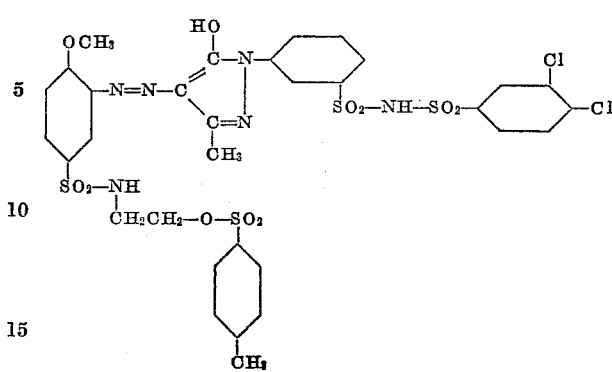
References Cited in the file of this patent
UNITED STATES PATENTS
2,518,078    Schmidt et al.    Aug. 8, 1950
2,606,185    Widmer et al.    Aug. 5, 1952